United States Patent Office 2,865,509
Patented Dec. 23, 1958

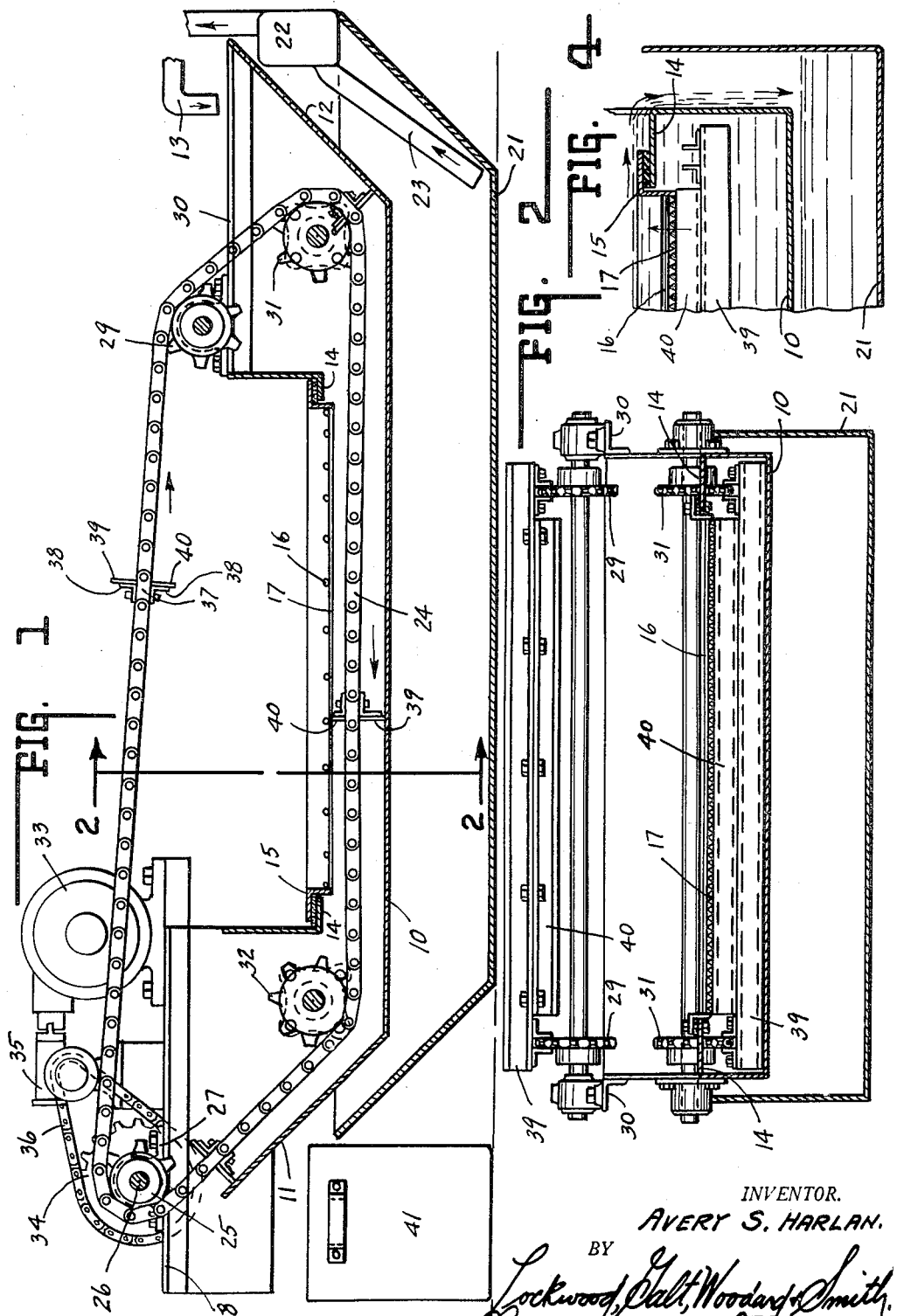

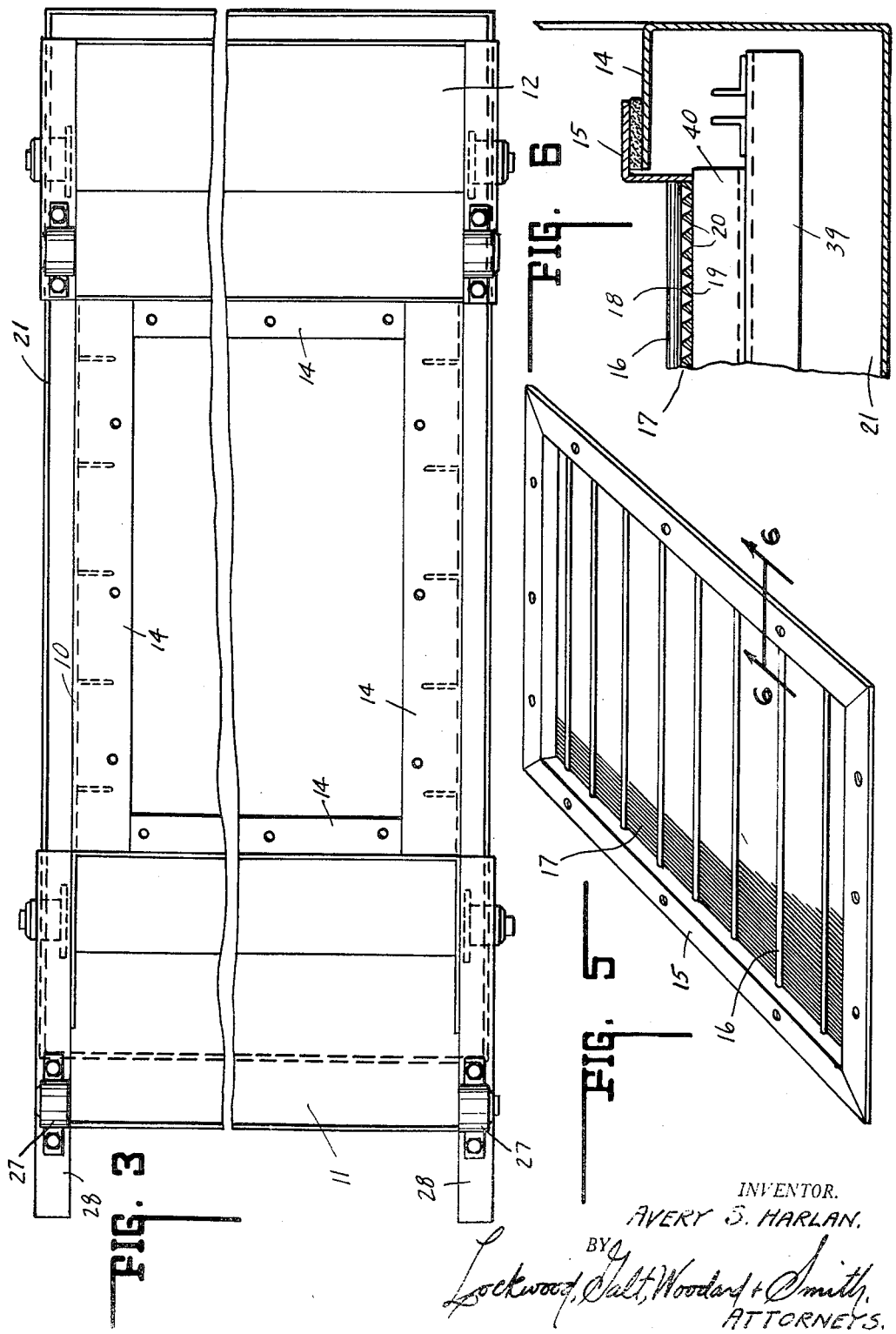

2,865,509

LIQUID FILTERING DEVICE

Avery S. Harlan, Indianapolis, Ind., assignor, by mesne assignments, to Indiana Commercial Filters Corporation, Lebanon, Ind., a corporation of Indiana Application April 15, 1955, Serial No. 501,623

5 Claims. (Cl. 210—312)

This invention relates to a liquid filtering device adapted to remove solids from a liquid such as machine coolants in a continuous operation for recirculation of the filtered coolant, but is similarly useful in the filtering of other liquids.

It is the object of the invention to provide a continuously operating filter device wherein the liquid to be filtered such as coolant will first deposit by gravity the solids carried thereby in a settling tank, and thereby freed of the heavier and coarser solids will flow upwardly through a filtering screen for filtering out the finer particles before overflowing into a receiving reservoir or tank from which it may be recirculated for continued use. Accordingly filtration is accomplished by the upward flow of the liquid through the filter medium so that by the aid of gravity the heavy solids will first be deposited and thereafter such finer solids as may be held in suspension may be filtered out. Thus the filter medium is never impaired by heavy deposits.

The heavier deposits which are gravity released from the liquid within the settling tank are scraped therefrom by suitable scrapers carried upon an endless belt. Said scrapers are also arranged to scrape the underside of the filtering screen or medium to remove any solids adhered thereto as the liquid filters upwardly and overflows into the receiving tank. The solids or particles in the form of sludge or swarf are thus continously removed from both the settling tank and the filtering medium so that the fresh liquid to be filtered is not materially contaminated thereby and the filtering medium remains unclogged for efficient filtering action. Such sludge is carried by the scrapers of the endless belt from the settling tank for discharge into a tote box for deposit.

The full nature of the invention will be understood from the accompanying drawings and the following description and claims:

Fig. 1 is a longitudinal section through the filtering device.

Fig. 2 is a section taken on the line 2—2 thereof.

Fig. 3 is a plan view of the filtering device with parts removed.

Fig. 4 is a cross section through a portion of the settling and receiving tanks illustrative of the overflow through the filter medium into the receiving tank.

Fig. 5 is a perspective view of the filtering medium in the form of a screen.

Fig. 6 is an enlarged section taken on line 6—6 of Fig. 5, with adjacent parts.

In the drawings there is shown an upper or superimposed settling tank 10 having an upwardly and outwardly sloping apron 11 at its discharge end and an upwardly and outwardly sloping apron 12 at its intake end. Over the intake end of the settling tank there is a discharge conduit 13 through which liquid to be filtered is discharged therein to flow down the downwardly sloping apron 12 to flow over the bottom of the tank 10. The tank 10 is formed with an intermediate dropped portion surrounded on all four sides by inwardly extending ledges 14 upon which the filter medium rests.

The filter medium which seats and rests upon the ledges 14 of the settling tank is shown in Figs. 5 and 6. It consists of a rigid panel comprising a frame 15 having a series of spaced supporting and reinforcing bars 16. Carried by the supporting bars 16 and frame 15 there is a filter screen 17 formed of a plurality of longitudinally extending wires of triangular cross section as shown in Fig. 6. These wires, being secured to the bars 16 as by soldering or brazing have their apexes indicated at 18 extending upwardly and their several bases indicated at 19 extending in the same plane and minutely spaced from each other as indicated at 20 through which the liquid may pass as the level thereof rises in the settling tank. Thus the lower surface of the filter medium lying in a horizontal plane permits the finer particles or solids held in suspension to be continuously removed therefrom by a suitable scraping action as hereinafter described. The frame 15 carrying the filtering medium rests upon the ledges 14 and may be readily removed for washing, vacuum cleaning and renewal.

The lower receiving tank 21 surrounds the lower portion of the settling tank 10, extending up to approximately the level of the filtering medium and being spaced slightly from the sides of the settling tank. Thus, as liquid to be filtered is introduced into the settling tank, depositing its heavier particles by gravity therein, the freed liquid with finer particles in suspension rises upwardly through the filtering medium 17 and overflows the side walls of the settling tank to be caught within the receiving tank 21 as a filtered liquid. From the tank 21 the filtered liquid may be removed by a circulating pump 22, or in any other suitable manner through the outlet conduit 23 extending downwardly in said tank.

For removing the deposit and sludge or swarf from the settling tank, and at the same time cleansing the filtering screen there is provided an endless belt here shown as a pair of sprocket chains 24. Said sprocket chains are driven by a pair of sprocket wheels 25 secured at each end of the drive shaft 26 carried by the bearings 27 on an elevated platform 28 at the discharge end of the settling tank. Said chains are carried over the upper sprockets 29 mounted on the platform 30 at the opposite end of the settling tank. Within the ends of the settling tank there is a pair of sprockets 31 and 32 about which the belt rides for guiding the lower flight thereof in a plane intermediate the bottom of the settling tank and the filtering screen 17. The endless belt is continuously driven by a motor 33 driving a gear 34 keyed to the shaft 26, said gear 34 being driven by the motor through the reduction gearing and the housing 35 and driving chain 36.

At intervals a pair of opposed scrapers is secured to said belt, extending transversely of the settling tank from one side to the other and secured at their opposite ends to the respective chains 24. Said scrapers are formed with a body portion 37 clamped to said chains respectively, said body portion including a pair of oppositely disposed angle iron bars 38 arranged to extend upwardly and downwardly relative to the path of travel of the belt. Secured to said angle iron bars there are provided oppositely extending laminated neoprene wipers 39 and 40. Said wipers are so arranged relative to the belt that the wiper 39 scrapes over the bottom of the settling tank carrying deposited sludge or swarf ahead of it and up the apron 11 to be spilled over into a tote box 41. The upper wipers 40 engage and wipe the lower surface 19 of the filtering screen 17 to remove any adhering fine particles therefrom.

Thus it will be observed that there is provided an upflow filter which puts gravity to work in removing the heavy solids before reaching the filter, filtration being accomplished by the upward flow of the released liquid through the filter medium, such filtered liquid overflowing into a receiving tank for recirculation. As the gravity deposit of solids and the filtration thereof proceeds the sludge or swarf is continuously removed and the filter medium cleansed. Thus the filtering efficiency is continuous and never impaired by heavy deposits.

The invention claimed is:

1. A liquid filtering device including an elongated walled settling tank for receiving unfiltered liquid at one end thereof, a lower receiving tank associated with the settling tank and arranged to provide an overflow passage for receiving filtered liquid therefrom, a filter medium supported on said settling tank spaced above the bottom thereof, said medium being liquid sealed about its periphery with the walls of the settling tank, means for discharging unfiltered liquid into said settling tank to rise in level through said filter medium and overflow through said passage into said receiving tank, an upwardly and outwardly sloping apron at the discharge end of said settling tank, an endless belt having one flight thereof movable in a plane intermediate the bottom of the settling tank and said filter medium, means for driving and guiding said belt through said plane, a plurality of scraping and wiping members secured to said belt for travel therewith in sliding engagement with the bottom of the settling tank and the lower surface of the filter medium to cleanse adhering particles from said filter medium and remove sludge from the bottom of said settling tank, and means for guiding said belt and members upwardly of said apron to the discharge end thereof for spilling sludge and particles therefrom.

2. A liquid filtering device including a walled settling tank having intake and discharge ends for receiving unfiltered liquid, a lower receiving tank associated with the settling tank arranged to provide an overflow passage for receiving filtered liquid therefrom, a filter medium comprising a plurality of closely spaced wires of triangular cross section extending from side to side of said settling tank, said wires having their apexes extending upwardly and their bases lying in a plane parallel with and spaced above the bottom of the settling tank with their adjacent edges closely spaced to permit liquid to filter upwardly therethrough and overflow through said passage into said receiving tank, said medium being liquid sealed about its periphery with the walls of the settling tank, a continuously moving scraper and wiper element mounted to travel in a plane parallel with said wires in scraping and wiping engagement with the bases thereof for removing adhering particles therefrom, a scraper and wiping element mounted to move along the bottom of said settling tank for scraping sludge and discharging it therefrom, and means connected with said scraper and wiper elements for moving them from the intake to the discharge ends of said tank.

3. A liquid filtering device including an upper walled settling tank having an inwardly and downwardly sloping end wall apron for receiving unfiltered liquid at one end thereof and an outwardly and upwardly sloping end wall apron for discharge of sludge from the other end thereof, the side walls of said tank having a lowered portion intermediate the end walls provided with a supporting ledge, a removable filtering frame supported on said ledge in substantially the plane of the upper edges of the lowered portions of the side walls, said frame having a series of transverse supporting bars and longitudinally extending wires secured thereon to provide a filter screen, a lower receiving tank embracing the settling tank means for delivering liquid to be filtered to the receiving end of said settling tank to flow therethrough toward the discharge end thereof and rise through said filter screen to overflow the lowered portions of said side walls into said receiving tank, sprockets mounted in the side walls of said settling tank adjacent the intake and discharge ends thereof, overhead sprockets carried thereby adjacent each end, endless chains extending about the respective sprockets with a flight thereof passing between the filter screen and the bottom of said settling tank, means for continuously driving said chains, and a plurality of scraper and wiping members carried between said chains to extend from one side of said settling tank to the other for simultaneous engagement with the bottom of said tank and the lower surface of said screen to remove sludge therefrom and carry it over the discharge end of said apron.

4. A liquid filtering device including an elongated settling tank adapted to receive liquid to be filtered at one end thereof for flow to the opposite end, an elongated receiving tank for filtered liquid surrounding said settling tank with its side walls spaced from the side walls thereof to provide a passage for liquid overflowing the side walls of said settling tank into said receiving tank, the walls of said settling tank having inwardly extending ledges, and a peripherally flanged filter medium seated on said ledges in sealing relation therewith through which liquid in said settling tank will pass upon the liquid level therein being elevated above the level of said filter medium, to provide an upflow filtering action whereby the filtered liquid will overflow said ledges and pass through said passageway into said receiving tank.

5. A liquid filtering device including an upper walled settling tank having an inwardly and downwardly sloping end wall apron for receiving unfiltered liquid at one end thereof and an outwardly and upwardly sloping end wall apron for discharge of sludge from the other end thereof, the side walls of said tank having a lowered portion intermediate the end walls provided with a supporting ledge, a removable filtering element supported on said ledge in substantially the plane of the upper edges of the lowered portions of the side walls, a lower receiving tank embracing the settling tank, means for delivering liquid to be filtered to the receiving end of said settling tank to flow therethrough toward the discharge end thereof and rise through said filter element to overflow the lowered portion of said side walls into said receiving tank, and means movable within said receiving tank for discharging accumulated sludge from said discharge apron.

References Cited in the file of this patent

UNITED STATES PATENTS

| 383,026 | Streeter | May 15, 1888 |
| 602,515 | McClatchey | Apr. 19, 1898 |
| 1,574,170 | Rosenau | Feb. 23, 1926 |
| 1,615,559 | Tark | Jan. 25, 1927 |
| 1,754,667 | Cabrera | Apr. 15, 1930 |
| 2,348,664 | Thompson | May 9, 1944 |

FOREIGN PATENTS

| 222,505 | Germany | May 28, 1910 |
| 442,007 | Italy | Nov. 15, 1948 |
| 513,638 | Belgium | Sept. 15, 1952 |